Jan. 24, 1928.

F. F. BAHNSON 1,657,362

PRESSURE REGULATING DEVICE

Filed July 31, 1922     3 Sheets-Sheet 1

Inventor:
Frederic F. Bahnson
by Byrnes Townsend + Brickenstei
Attorneys.

Jan. 24, 1928.

F. F. BAHNSON 1,657,362

PRESSURE REGULATING DEVICE

Filed July 31, 1922

Inventor:
Frederic F. Bahnson

Patented Jan. 24, 1928.

1,657,362

UNITED STATES PATENT OFFICE.

FREDERIC F. BAHNSON, OF WINSTON-SALEM, NORTH CAROLINA.

PRESSURE-REGULATING DEVICE.

Application filed July 31, 1922. Serial No. 578,840.

This invention relates to pressure regulating devices and particularly to a temperature controlled pressure regulating device which is primarily designed for use in connection with humidifying systems employing hygroscopically controlled humidifiers such, for example, as described in application Ser. No. 587,632 filed Sept. 11, 1922, which is a division of my copending application, Serial No. 249,697, filed August 13, 1918.

In its broader aspects, the invention contemplates the addition to any fluid delivering system of the type in which the flow is established or interrupted for the purpose of maintaining a predetermined condition at the point of use, of control apparatus effective to vary the rate at which the fluid may be delivered to the point of use in accordance with the quantity of fluid necessary to establish the predetermined condition.

The control described in my prior application operates in accordance with the percentage of moisture present in the air but is not affected by the temperature of the air, which temperature obviously affects the capacity of the air to take up moisture. Such an apparatus will operate very efficiently when the system is in continuous operation but it has been found that an excess of water may be thrown into the air during the short period before the hygroscopic control becomes effective if a system which is used only during certain hours of the day is started up when the room temperature is comparatively low. Various experiments which have been made with such a humidifying system have shown that it is feasible to provide a manual control for limiting the amount of water which is thrown out when the room temperature is low, but the advantages of an automatic control for securing this regulation are obvious.

The present embodiment of my invention is designed to provide an auxiliary control for use with a hygroscopically controlled humidifier which will limit the amount of water vaporized in accordance with the capacity of the air to absorb moisture.

An object of the invention is to provide an improved fluid delivering system which includes apparatus effective to vary the pressure upon the fluid in accordance with the quantity required to maintain a predetermined condition which is affected by the flow of fluid. A further object of the invention is to provide a thermostatic control for use with a supply of fluid under pressure which is operative to increase the pressure, and therefore, the maximum rate of discharge of the fluid, as the temperature rises. An object of the invention is to provide a pressure regulating device for use with a humidifying system having a supply of water under pressure and which will vary the water pressure in proportion to the capacity of the air to absorb moisture. A further object of the invention is to provide a humidifying system in which the flow of water to a humidifier is controlled by a hygroscopic device and in which the pressure of the water supplied to the hygroscopic device is varied in proportion to changes in air temperature. More specifically an object of the invention is to provide an effective and efficient thermostat for use in humidifying systems of the type stated.

These and other objects of the invention may be attained by the embodiment which is illustrated in the accompanying drawings, in which Fig. 1 is a sectional elevation of the thermostat and pressure regulating device, the section through the thermostat being taken on line 1—1 of Fig. 2.

Figure 1:
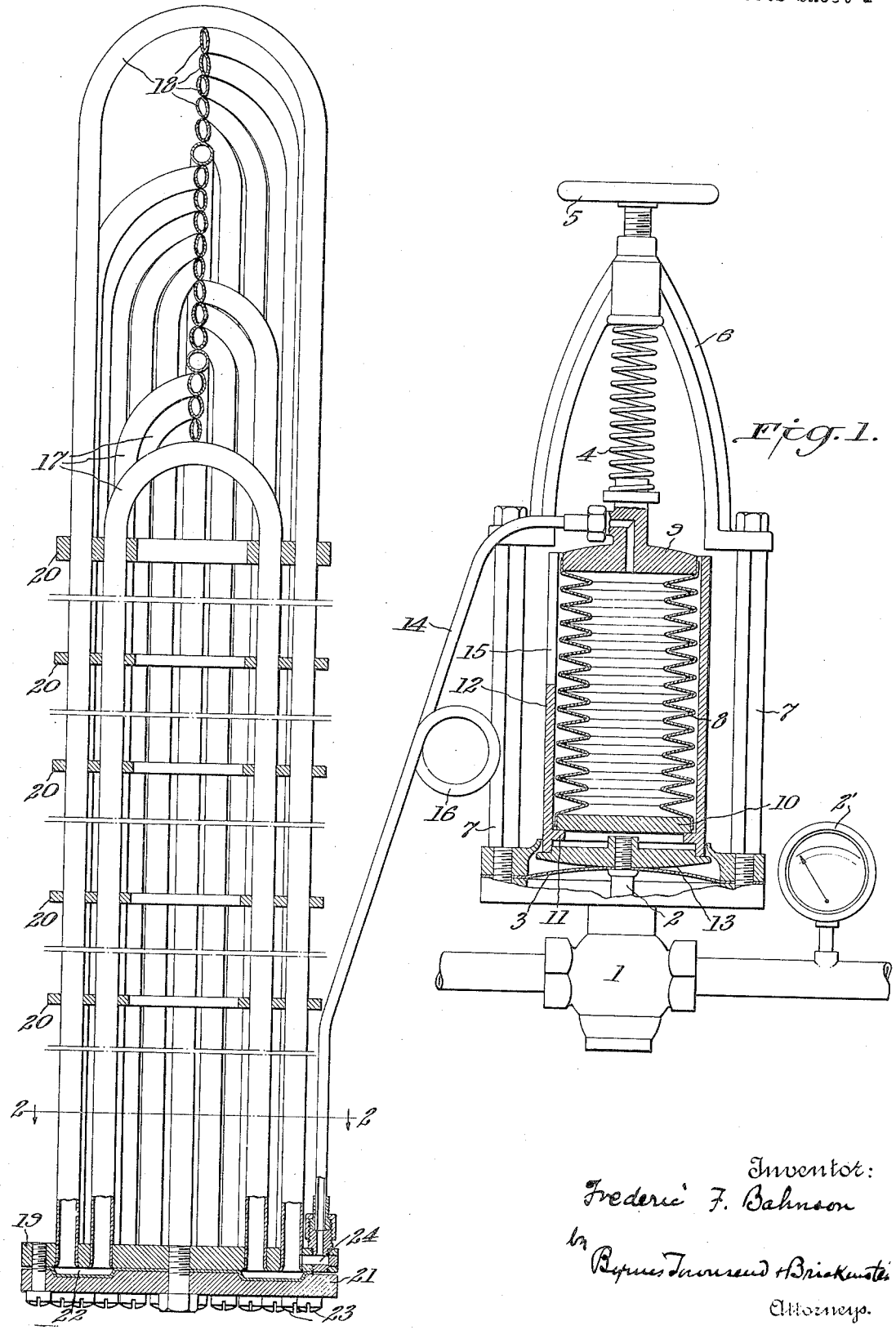
Figure 2:
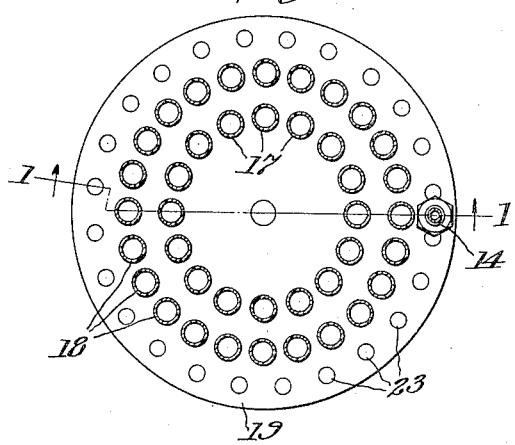
Fig. 2 is a horizontal section through the thermostat on line 2—2 of Fig. 1.
Figure 3:
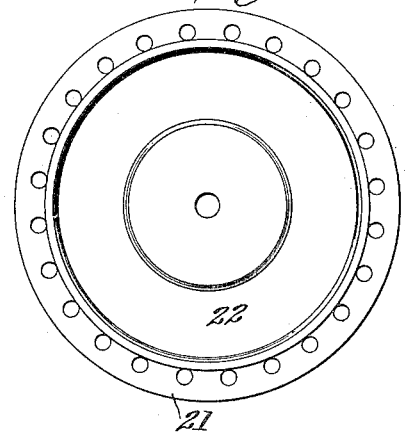
Fig. 3 is a plan view of the base plate of the thermostat.
Figure 4:
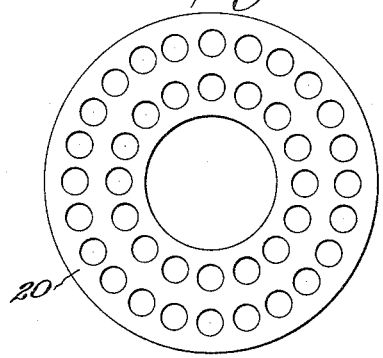
Fig. 4 is a plan view of one of the thermostat spacers.

In the drawings, the regulating valve which controls the pressure under which water is supplied to the various humidifiers is designated by the numeral 1. As here shown, the valve 1 includes a stem 2 which is carried by a diaphragm 3 which is subject to the pressure on the discharge side of the valve, which pressure may be conveniently read from a suitable gauge 2'. In pressure regulating valves of this general type, the usual construction employs a spring acting upon the diaphragm 3 for determining the pressure at which the valve may open. The regulating valve embodying my invention also includes such a spring 4, the pressure of which may be regulated by the hand wheel 5 which is mounted in a yoke 6 carried by studs 7. In addition to the manual control of the pressure which may be obtained by means of the spring 4, an automatic control is secured by introducing an expansible element between the diaphragm 3 and spring 4. In this particular embodiment, the expansible element comprises a sylphon bellows 8 having an upper head 9 upon which the spring 4 rests and a lower head 10 which rests upon a flange 11 formed on the interior of a protecting jacket or sleeve 12. The lower edge of the sleeve 12 rests upon the upper surface of a plate 13 which is threaded upon the upper end of the valve stem 2.

The upper head 9 of the sylphon bellows is provided with a passage communicating with a pipe 14 and the sleeve 12 is slotted at 15 to permit the downward movement of the head 9 and pipe 14. The pipe 14 is preferably formed of thin copper tubing and may be looped as at 16 to insure greater flexibility. The pipe 14 establishes communication between the sylphon bellows and a thermostat which comprises a plurality of U-tubes containing wood alcohol or other expansible fluid. To secure a compact structure, an inner set of tubes 17 and an outer set of tubes 18 are used, and the opposite ends of the tubes of both sets pass through and are mounted in a block 19. As here shown, the block 19 comprises a circular plate and the tube ends are arranged along the circumferences of an inner and outer circle with the various tubes lying in planes passing diametrically across the plate 19, but it is obvious that other arrangements of the various U-tubes may be employed. To prevent distortion of the tubes 17, 18, which may be of considerable length and are formed of thin material such as copper tubing, a plurality of spacers 20 are provided. The base plate 21 of the thermostat consists of a circular plate having an annular groove formed in its upper surface and to provide a fluid-tight joint between the plates 19 and 21, a thin lead washer 22 is spun onto the surface of the plate 21. The washer 22 is of less diameter than the plates 19, 21 and outside of the edge of the washer 22 a series of clamping bolts 23 pass through the plate 21 and are threaded into the plate 19. The pipe 14 may be connected with the fluid chamber of the thermostat by a passage 24 in the plate 19 which may be conveniently formed by drilling a hole radially of the plate 19 and into one of the tubes 18 and intersecting this passage by a hole drilled from the upper surface of the plate. The outer end of the radial passage and lower end of the vertical hole may then be plugged in any desired manner.

Figure 5:
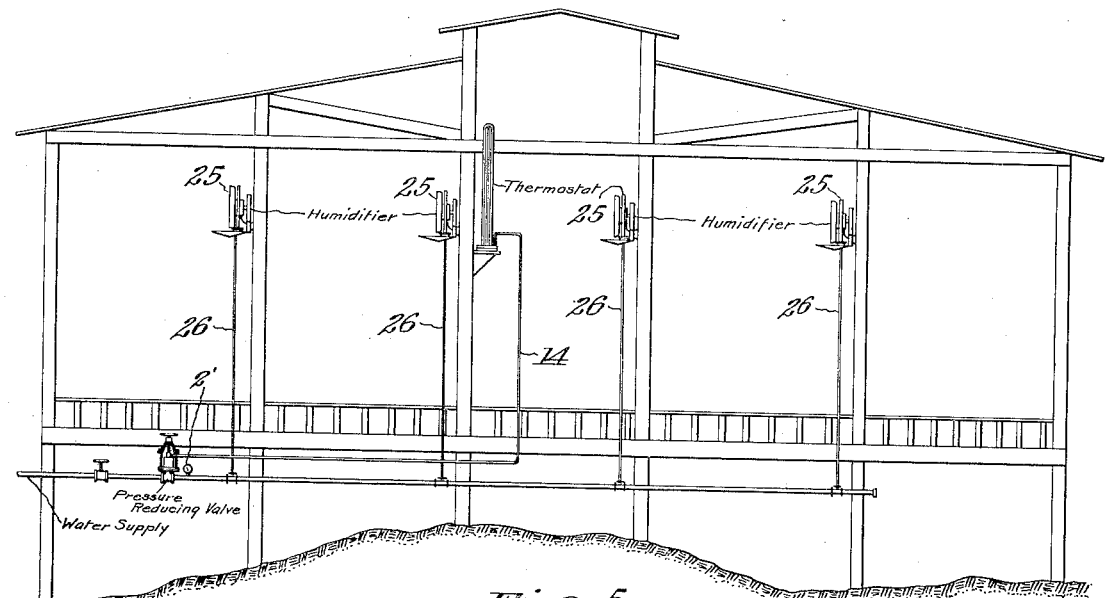
Fig. 5 is an elevation showing a humidifying system in which the invention is embodied.
Figure 6:
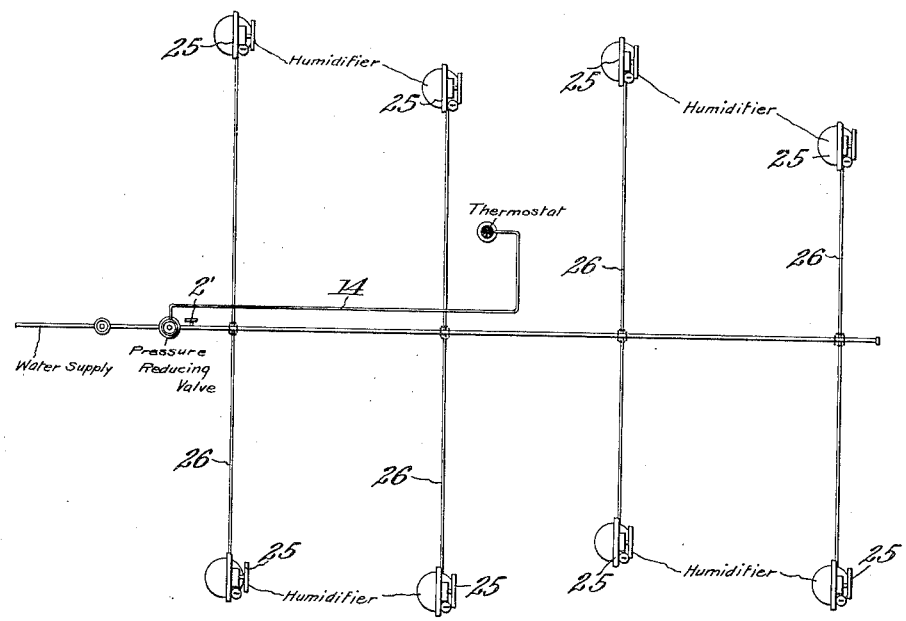
Fig. 6 is a plan view of the humidifying system shown in Fig. 5.

A typical installation in a factory building of a humidifying system employing the invention is shown in Figs. 5 and 6. The various humidifiers may be of the type described in my application, Serial No. 587,632, and include hygrometric elements 25 for regulating the flow of water to the humidifiers from the several branch pipes 26 in accordance with the percentage of moisture in the air. The pressure regulating valve is located at any convenient point between the water supply and the various pipes 26 and the thermostat may be located at any convenient point where it will be subject to the average room temperature. With any installation the change in pressure should be substantially proportional to the change in temperature but it is obvious that the actual change in pressure for a given temperature change may vary with different installations. The following specific example will illustrate the method of designing and adjusting the apparatus for use.

A pressure regulating valve of the usual type, i. e., one in which the spring 4 rests directly upon the diaphragm 3, and a pressure gauge 2' are introduced into the water supply pipe. Tests are made to determine the maximum pressure under which water may be supplied at various temperatures and without causing "wetting" during the period which elapses before the hygrometric control becomes operative when the humidifiers are first started. If it is found, for example, that a water pressure of 5 pounds should be employed for a room temperature of 60°, a pressure of 15 pounds for 75° and a pressure of 20 pounds for 80°, it is obvious that the pressure regulating valve must be automatically adjusted to provide for an increase in pressure of one pound for each degree rise in temperature. The spring 4 of the regulating valve is then calibrated to determine the rise in pressure caused by a shortening of the spring by a fixed amount, say one-half inch. If such movement of the spring corresponds to a change in pressure of 15 pounds, it follows that a sylphon bellows capable of changing its effective length by 1½ inches will be needed if a range in temperature of 45° is to be provided for and that a thermostat of sufficient size to produce an expansion of the sylphon bellows of one-half inch for each fifteen degrees rise in temperature is needed. A sylphon bellows of the appropriate size is introduced between the spring and diaphragm of the regulating valve by substituting the studs 17 for the bolts which previously clamped the yoke 6 to the valve casing. A thermostat of appropriate size is made up, completely filled with liquid in any desired manner and connected to the sylphon bellows. To adjust the pressure regulating valve when the apparatus is assembled, the room temperature is noted and the spring 4 is adjusted by means of the hand wheel 5 until the gauge 2' indicates the water pressure which corresponds to the room temperature. The operation of the apparatus is then automatic and a variation in temperature of one degree will cause a corresponding variation of one pound in the water supply line.

Although the invention has been described in connection with a humidifying system, it is obvious that it may be employed with other supply systems in which the flow of fluid to a point of use is automatically established or discontinued for the purpose of maintaining thereat a predetermined physical condition such as a temperature, pressure, humidity, fluid level or the like. For example, in refrigerating systems in which the physical condition to be controlled is the temperature in a storage room, the regulation of the brine supplied to the cooling system has been purely qualitative, i. e. the circulation of brine through the room has started and has stopped as the critical physical property (in this case, temperature) varied from a predetermined value. In accordance with the invention, this qualitative control is rendered quantitative by the addition of mechanism effective to control the rate of fluid supply in accordance with the relative variation of the predetermined physical property (temperature) from its predetermined value. By introducing a pressure regulating valve into the inlet line of a centrifugal circulating pump and controlling the same from a thermostat located in the storage room, brine may be supplied at a more rapid rate when the room temperature is relatively high than that at which it is supplied when the room temperature varies from the predetermined temperature by a smaller amount.

It is to be understood that the specific embodiment herein described is but illustrative of my invention and that many changes which may be made in the various elements, their relative size, shape, proportion and arrangement, fall within the scope of my invention as set forth in the following claims.

I claim:

1. In a humidifying system, the combination with a humidifier and means for throwing the humidifier into and out of operation to maintain predetermined humidity conditions, of means dependent upon the air temperature for regulating the rate at which water is delivered by said humidifier.

2. The combination with a humidifier having a hygroscopic device for regulating the discharge of water therefrom, of a pipe for supplying water to said humidifier and means for varying the pressure of the water in said supply pipe in proportion to changes in air temperature.

3. In a humidifying system, a humidifier, a pipe for supplying water under pressure to said humidifier, a valve in said pipe, a spring operative upon said valve to control the pressure in said pipe, and temperature-controlled means for varying the pressure of said spring.

4. In a humidifying system, a humidifier, a pipe for supplying water to said humidifier, a valve for controlling the pressure of the water supplied to said humidifier, a spring operative upon said valve, an expansible element for varying the pressure of said spring and thermostatic means for varying the length of said expansible element.

5. In a humidifying system, a humidifier, a pipe for supplying water to said humidifier, and a pressure regulating valve in said pipe, said valve comprising a valve stem, a spring, and a temperature-controlled expansible element between said spring and valve stem.

6. The combination with a humidifier having a hygroscopic device for controlling the operation thereof, of a conduit for supplying water to said humidifier, and means for varying the rate of flow through said conduit in proportion to changes in air temperature.

7. In means for maintaining a fixed relative humidity within a space, the combination of means for discharging water in a finely divided condition into the said space, a valve for controlling the quantity of water discharged, means affected by the heat within the space for exerting a force and effecting a movement of the said valve, and means actuated by the pressure of water after passing the valve for exerting a force that will oppose and balance said heat-developed force and arrest the movement of the valve at a point where the pressure of water on the discharge side of the valve is that required to effect the delivery of a quantity of water equal to that required for a specified humidity within the said space.

8. In means for maintaining a fixed relative humidity within a space, the combination of means for discharging water in a finely divided condition into the said space, means affected by the water content of the air within the space for regulating the discharge of said water at the point of discharge, a valve for effecting initial control of the quantity of water discharged, means affected by the heat within the space for exerting a force and effecting a movement of the said valve, and means actuated by the pressure of water after passing the valve for exerting a force that will oppose and balance said heat-developed force and arrest the movement of the valve at a point where the pressure of water on the discharge side of the valve is that required to effect the delivery of a quantity of water to the discharging device equal to that required for a specified humidity within the said space.

9. In means for maintaining a fixed relative humidity within a space, the combination of an atomizing device, means affected by the water content of the air within the space for regulating the discharge of water through said atomizinz device, a valve for controlling the pressure of water delivered to said atomizing device, means affected by the heat within the space for exerting a force and effecting a movement of said valve and means actuated by the pressure of water after passing the valve for exerting a force that will oppose and balance said heat developed force and arrest the movement of the valve at a point where the pressure of water on the discharge side of the valve is that required at the atomizing device for maintaining a desired relative humidity.

10. In means for maintaining a fixed relative humidity within a space, the combination of means for discharging water in an atomized condition into the said space, a thermostatically positioned valve for controlling the pressure of water supplied to said atomizing device, and a hygrostatically controlled device associated with said atomizing device for regulating the discharge of water.

11. In means of the class described, the combination of an atomizing device, a valve for controlling the pressure of water supplied to said atomizing device, a thermostat affected by the temperature of the space to be regulated for positioning said valve, a hygrostat affected by the water content of the air within said space for controlling the operation of said atomizing device, the amount of water discharged into said space being dependent upon the action of both said thermostat and said hygrostat.

12. In apparatus of the class described, the combination of means for atomizing water into a space, a valve for controlling the pressure of water delivered to said atomizing device, a thermostat acting in opposition to the pressure of water delivered to said atomizing device for positioning said valve and a hygrostat associated with said atomizing device for regulating the quantity of water discharged through said atomizing device.

13. In a humidifying system, a humidifier, a pipe for supplying water to said humidifier, and a flow regulating valve in said pipe, said valve comprising a casing, a valve, means actuated by the pressure of water at the outlet side of said valve for exerting a force tending to close the said valve, spring means acting upon said valve, and temperature controlled means co-operating with said spring means to exert a force tending to open said valve.

In testimony whereof, I affix my signature.

FREDERIC F. BAHNSON.